US007225815B2

United States Patent
Kung

(10) Patent No.: US 7,225,815 B2
(45) Date of Patent: Jun. 5, 2007

(54) SELF-CLEANING HAIR BRUSH

(76) Inventor: Shin Sheng Kung, 4Fl.-2, 23, Lane 22, Gi-Lin Rd., Taipei (TW)

( * ) Notice: Subject to any disclaimer, the term of this patent is extended or adjusted under 35 U.S.C. 154(b) by 0 days.

(21) Appl. No.: 10/907,083

(22) Filed: Mar. 18, 2005

(65) Prior Publication Data
US 2006/0207623 A1 Sep. 21, 2006

(51) Int. Cl.
*A45D 24/42* (2006.01)
(52) U.S. Cl. ..................... 132/119; 119/628
(58) Field of Classification Search ............... 119/628, 119/633, 629, 612, 615; 132/119
See application file for complete search history.

(56) References Cited

U.S. PATENT DOCUMENTS

| 307,574 | A | * | 11/1884 | Newell et al. | 119/628 |
|---|---|---|---|---|---|
| 2,708,765 | A | | 5/1955 | Vann | 15/246 |
| 3,110,053 | A | | 11/1963 | Surabian | 15/159 |
| 3,172,139 | A | | 3/1965 | Wire | 15/160 |
| 3,368,554 | A | | 2/1968 | Chou | 128/67 |
| 4,028,768 | A | | 6/1977 | Pascal | 15/203 |
| 4,202,361 | A | | 5/1980 | Bills | 132/123 |
| 4,225,997 | A | | 10/1980 | Thomas et al. | 15/184 |
| 4,412,365 | A | | 11/1983 | Schmitt | 15/184 |
| 4,860,692 | A | | 8/1989 | Beard | 119/88 |
| 5,267,528 | A | | 12/1993 | Murieen, Sr. | 119/88 |
| 5,862,563 | A | | 1/1999 | Hartmann | 15/169 |
| D411,048 | S | | 6/1999 | Pinon | D4/136 |
| 5,926,902 | A | | 7/1999 | Pierre | 15/169 |
| 6,021,542 | A | | 2/2000 | Norman | 15/169 |
| 6,279,582 | B1 | | 8/2001 | Wang | 132/154 |
| 6,427,633 | B1 | | 8/2002 | Ogden | 119/628 |
| 6,618,893 | B1 | | 9/2003 | Wang | 15/186 |
| 6,681,775 | B2 | * | 1/2004 | Wang | 132/119 |
| 2002/0029749 | A1 | * | 3/2002 | Berman | |

* cited by examiner

*Primary Examiner*—Todd E. Manahan
*Assistant Examiner*—Rachel A. Running
(74) *Attorney, Agent, or Firm*—Alan Kamrath; Kamrath & Associates PA

(57) ABSTRACT

A self cleaning hair brush includes a handle (12), a bristle-holding head (14) having a plurality of spaced-apart bristles (16) projecting laterally therefrom, and a combing plate (18) having a plurality of bristle-receiving apertures (46). When the combing plate (18) is in a first position, the combing plate (18) closely overlies the side of the bristle-holding head (14) from which the bristles (16) project allowing the bristles (16) to project through the apertures (46). The bristle-holding head (14) further includes a rectangular tube (22) disposed on a central portion of the bristle-holding head (14). A reciprocally movable plunger (20) is mounted in the rectangular tube (22). The plunger (20) is used to displace the combing plate (18) to a second position where the combing plate (18) is disposed at a free end of the bristles (16). The reciprocally movable plunger (20) includes a pivotable latching pin (78) for automatically locking the plunger (20) into an intermediate position between the first and second positions.

15 Claims, 2 Drawing Sheets

SELF-CLEANING HAIR BRUSH

BACKGROUND OF THE INVENTION

The present invention relates to a hair brush with a plurality of bristles, more particularly to a hair brush provided with an extendable combing plate for removing tangled hair strands from the bristles, and specifically to a hair brush which automatically locks the combing plate when depressing a plunger which displaces the combing plate.

As anyone with a hair brush is aware, stray hairs may become entangled in the bristles after extended use. The problem is compounded when brushing the coat of a pet which sheds its hair. Getting the stray hairs from the bristles can be time consuming. In some cases, the user picks the hair out using his or her fingers or using a special tool. However, neither of these methods is entirely satisfactory when stray hairs remain tangled in the bristles. Alternatively, the prior art teaches self-cleaning grooming brushes which clean the bristles either by having them retract into a housing or by pushing the stray hairs off by extending a combing plate over the bristles. Examples of these previously known devices are disclosed in U.S. Pat. Nos. 5,267,528; 6,427,633; and 6,681,775. However, prior art hair brushes have proven unwieldy in that they require either two hands to extend the combing plate and/or lack an effective mechanism for locking the combing plate into an extended position.

Thus, a need exists for a novel hair brush providing improvement over prior art hair brushes, especially in that the removal of stray hairs from the bristles is more easily facilitated.

SUMMARY OF THE INVENTION

The present invention solves this need and other problems in the field of self-cleaning hair brushes by providing a bristle-holding head having a plurality of spaced-apart bristles projecting therefrom. When a combing plate is in a first position, the combing plate closely overlies a side of the bristle-holding head from which the bristles project so that the bristles extend through bristle-receiving apertures of the combing plate. A plunger is fixed to and projects from the combing plate and is reciprocally mounted to the bristle-holding head to displace the combing plate to a second position relative to the bristle-holding head where the combing plate is disposed at a free end of the bristles. When the user wishes to remove hair strands from the bristles, he or she presses the reciprocally movable plunger until the combing plate is in the second position. The plunger is operationally connected to latch with the bristle-holding head and automatically locks the combing plate in the second position when the plunger is depressed so the user can then easily wipe the hair strands from the combing plate. Once the hair strands are removed, the user retracts the combing plate by increasing and then reducing the force on the reciprocally movable plunger to unlatch the plunger from the bristle-holding head, and the combing plate returns to the first position where the bristles are again exposed through the apertures in the combing plate.

The present invention will become clearer in the light of the following detailed description of an illustrative embodiment of this invention described in connection with the drawings.

BRIEF DESCRIPTION OF THE DRAWINGS

The illustrative embodiment may best be described by reference to the accompanying drawings where.

Figure 1:
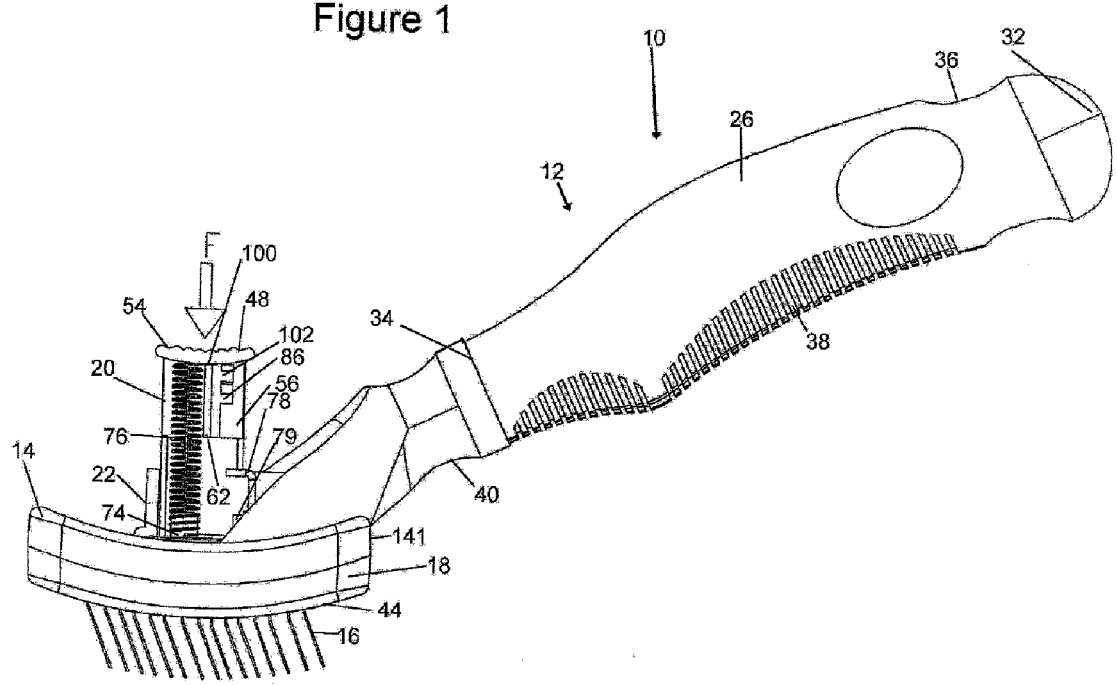
FIG. 1 is a side view, partially in cross section, of a self-cleaning hair brush of the preferred embodiment of the present invention where the combing plate is disposed in a first position.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "upper", "lower", "end", "side", "horizontal", "vertical", and similar terms are used herein, it should be understood that these terms have reference only to the structure shown in the drawings as it would appear to a person viewing the drawings and are utilized only to facilitate describing the illustrative embodiment.

DETAILED DESCRIPTION OF THE PREFERRED EMBODIMENT

A hair brush according to the preferred teachings of the present invention is shown in the drawings and generally designated 10. Specifically, the hair brush 10 of the preferred form of the present invention shown includes a handle 12 connected on one end to a bristle-holding head 14. The bristle-holding head 14 has a plurality of spaced-apart bristles 16. A combing plate 18 is affixed to a plunger 20. The plunger 20 is reciprocally mounted to bristle-holding head 14 by slideable receipt through a rectangular tube 22. The rectangular tube 22 integrally extends through a central portion of the bristle-holding head 14. Thus, when the reciprocally movable plunger 20 is depressed, the combing plate 18 is urged toward the free end of the plurality of bristles 16.

Figure 2:
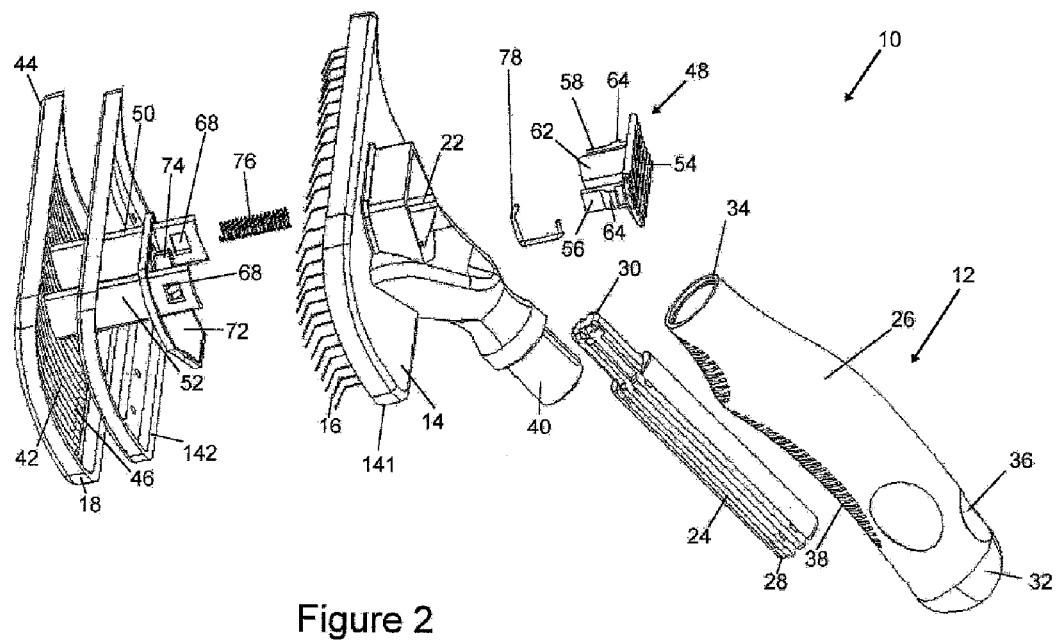
FIG. 2 is an exploded perspective view of the self-cleaning hair brush of FIG. 1.
Figure 3:
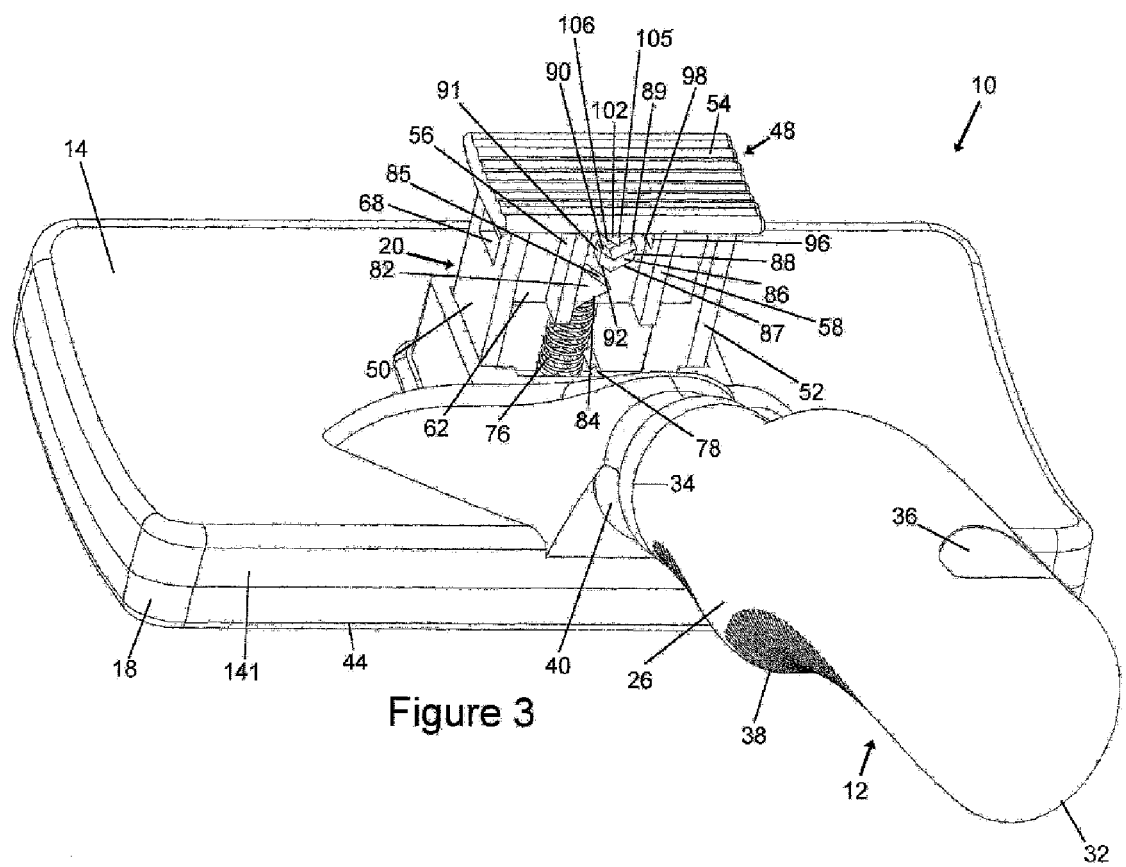
FIG. 3 is a perspective view of the self-cleaning hair brush of FIG. 1.
Figure 4:
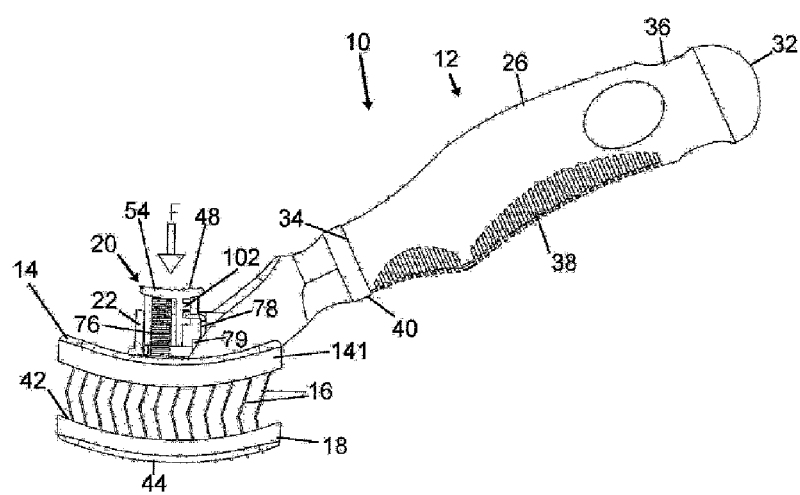
FIG. 4 is a side view, partially in cross section, of the self-cleaning hair brush of FIG. 1 where the combing plate is disposed in a second position.

As can be seen in FIG. 2, the handle 12 includes a rigid spine member 24 and a surrounding molded sheath 26. Sheath 26 can be formed of compressible material to increase the comfort and gripability of the handle 12. The spine member 24 has a first end 28 and a second end 30. Likewise, the sheath 26 has a first end 32 and a second end 34. A handle aperture 36 is disposed proximate the first end 32 of the sheath 26 for hanging the hair brush 10 on a hook or the like. The sheath 26 further includes corrugations 38 to assist in gripping the handle 12 so that it does not slip from the user's hand. The spine member 24 connects the handle 12 to the bristle-holding head 14 by inserting the second end 30 into tubular head socket 40 which is integrated with the bristle-holding head 14.

The combing plate 18 has an inner surface 42, an outer surface 44 and a plurality of bristle-receiving apertures 46 formed through the thickness dimension of the plate 18 between surfaces 42 and 44. When the combing plate 18 is in a first position, the combing plate 18 closely overlies the side of the bristle-holding head 14 from which the bristles 16 project so that the bristles 16 extend through the apertures 46 and beyond the outer surface 44 of the combing plate 18.

The reciprocally movable plunger 20 includes a push button 48 that interlocks with first and second parallel, spaced-apart leg members 50 and 52, which are fixed to and project from the inner surface 42 of the combing plate 18. The push button 48 has a top plate 54 and a plurality of mutually perpendicular walls 56, 58 and 62. The first and second side walls 56 and 58 each have a barb 64 projecting from exterior sides thereof. The first and second leg members 50 and 52 each have a leg barb aperture 68. The barb 64 of the side wall 56 snaps through the aperture 68 of the first leg member 50, and the barb 64 of the second side wall 58 snaps into the barb aperture 68 of the second leg member 50. Thus, movement of the push button 48 is transferred to the combing plate 18 so that the combing plate 18 moves along the bristles 16.

As seen in FIG. 2, the bristle-holding head 14 includes a first rectangular frame 141 and a second annular frame 142 received in the first rectangular frame 141. A carrier including the bristles 16 is sandwiched between the frames 141 and 142, with the bristles 16 extending through the inner opening of the annular frame 142. The tubular head socket 40 is integrally formed with the frame 141. A resistance plate 72 is separately molded and secured such as by adhesion to the frame 141 of the bristle holding head 14 and is located proximate to the rectangular tube 22. For purposes of illustration, the resistance plate 72 is shown as being located on the leg members 50 and 52. In actual production, the resistance plate 72 is located between the carrier including the bristles 16 and the first rectangular frame 141.

The resistance plate 72 has a center cylindrical projection 74 extending upward toward and into the rectangular tube 22. First and second slot members are provided in the resistance plate 72 so that the first and second leg members 50 and 52 are able to pass through the resistance plate 72 to connect to the push button 48 as described above. A coil spring 76 is disposed about the central center projection 74. The coil spring 76 extends between the resistance plate 72 and the top plate 54 so as to bias the reciprocally movable plunger 20 so that the combing plate 18 is normally disposed in the first position closely adjacent the bristle-holding head 14. When the push button 48 is fully depressed, the combing plate 18 extends to the free end of the bristles 16 and the coil spring 76 is fully compressed.

The reciprocally movable plunger 20 also includes a U-shaped latching pin 78 which is pivotably mounted to the resistance plate 72. Specifically, the lower horizontal end portion or leg of the latching pin 78 is pivotally secured to the resistance plate 72 by receipt in slots formed in an arcuate stop 79 and the center projection 74. In the preferred form, the lower leg is bent perpendicular to a body segment, and the latch pin 78 further includes an upper horizontal end portion or leg bent perpendicular to the body segment at the end opposite to the lower leg. Suitable provisions, such as abutments formed in the rectangular tube 22, can be provided to limit the range that latch pin 78 can pivot.

The upper leg of the latching pin 78 is guided by a plurality of triangular-shaped projections disposed on the back wall 62 and intermediate the side walls 56 and 58. Specifically, a first triangular-shaped projection 82 is disposed on the back wall 62 proximate a bottom surface of the back wall 62. The first triangular-shaped projection 82 has a lower side 84 and an upper side 85 intersecting at an acute angle in the order of 90° and each extending generally at an angle in the order of 45° to the side walls 56 and 58. When the push button 48 is initially depressed, the upper leg of the latch pin 78 abuts with the lower side 84 of the first triangular-shaped projection 82 and is moved up at an angle toward a chevron-shaped projection 86. The chevron-shaped projection 86 has a first side 87, a second side 88, a third side 89, a fourth side 90, a fifth side 91, and a sixth side 92. The first side 87 is arranged generally parallel to but vertically and horizontally spaced from the lower side 84. The upper leg of the latch pin 78 abuts with the first side 87 of the chevron-shaped projection 86 and then is guided between the second side 88 of the chevron-shaped projection 86 and the side wall 56 so that it moves upward toward a second triangular projection 96. The second side 88 is parallel to but spaced from the side wall 56. The second triangular projection 96 has a single contact side 98 which guides the latch pin 78 to a top surface of the back wall 62 and the bottom surface of the top plate 54 and vertically above the third side 89. Side 98 is generally parallel to side 84 and extends at an angle in the order of 45° to the back wall 62 and the side wall 56. When the latch pin 78 is in contact with the bottom surface of the top plate 54, the upper leg of the latch pin 78 is located between the contact side 98 of the second triangular projection 96 and a contact side 105 of a third triangular projection 102 and the combing plate 18 is fully extended. The contact side 105 extends at a small acute angle to the contact side 98. When the thumb force acting against the push button 48 is reduced, the upper leg of the latch pin 78 moves towards the third side 89 of the chevron-shaped portion 86 and becomes cradled between the sides 89 and 90 of the chevron-shaped portion 86. The sides 89 and 90 of the chevron-shaped portion 86 define a V-shaped slot. The upper leg of the latch pin 78 cradled in chevron-shaped projection 86 prevents movement of the plunger 20 under the bias of the coil spring, with the combing plate 18 being in a second position which is intermediate the first position and the fully extended position. When thumb pressure is once again applied to the push button 48, the latch pin 78 is lifted from the V-shaped slot defined in the chevron-shaped projection 86 toward a second side 106 of the third triangular projection 102 such that when the push button 48 is fully depressed, the upper leg of latch pin 78 is once again proximate to the top surface 100 of the back wall 62 and the bottom surface of the top plate 54. The second side 106 is parallel to and spaced from the contact side 98. When the force acting on the push button 48 is again reduced, the upper leg of the latch pin 78 is guided back to its starting position by a channel formed between the side wall 58 and the fifth side 91 of the chevron-shaped projection 86 parallel thereto. Further, the upper leg of the latch pin 78 is guided between the sixth side 92 of the chevron-shaped projection 86 and the upper side 85 of the first triangular-shaped projection 82 which are parallel to each other to a position below the first triangular-shaped projection 82.

When the combing plate 18 is extended into its second position, hair can be easily wiped off the outer surface 44 of the combing plate 18. Moreover, if the user wishes to adjust the length of the bristles 16 while combing hair, he or she may extend the combing plate 18 to shorten the bristle length by applying pressure to the push button 48.

Because the latching pin 78 pivots on the resistance plate 72 and cooperates with the plurality of triangular-shaped projections to guide the upper leg of the latching pin 78 into the V-shaped slot defined by the chevron-shaped projection 86, the plunger 20 is operationally connected to latch with the bristle-holding head 14 and automatically locks with the combing plate 18 in the second position by merely depressing and releasing the plunger 20. Thus, the user can displace the combing plate 18 from the first position and lock the combing plate 18 into the second position by adjusting the force applied to the reciprocally movable plunger 20. The user, therefore, can adjust the combing plate 18 with only one hand, leaving the other hand available for doing other things.

Now that the basic teachings of the present invention have been explained, many extensions and variations will be obvious to one having ordinary skill in the art. As an example, the self-cleaning hair brush 10 as shown in the drawings is a preferred form, and self-cleaning brush 10 can have other forms and constructions according to the teachings of the present invention. By way of further example, bristles 16 are shown in the preferred form as being formed of bent wire but could take other forms including but not limited to being formed of plastic. Similarly, bristle-holding head 14 is shown in the preferred form as being formed of multiple pieces assembled together but could take other forms including of differing types or including pieces of different constructions and shapes. Likewise, handle 12 according to the teachings of the present invention could be of a variety of forms and/or constructions or could be omitted if the bristle-holding head 14 is designed to be directly gripped.

This invention has been described herein in considerable detail in order to comply with the patent statutes and provide those skilled in the art with the information needed to apply the novel principles and to construct and use such specialized components as are required. However, it is understood that the invention can be carried out by specifically different equipment and devices, and that the various modifications, both as to the equipment and the operating procedures, can be accomplished without departing from the scope of the invention itself.

What is claimed is:

1. A self-cleaning hairbrush comprising, in combination:
   a) a bristle-holding head having a plurality of spaced apart bristles projecting from one side of the bristle-holding head;
   b) a combing plate having a plurality of bristle-receiving apertures, with the bristles projecting through the bristle-receiving apertures when the combing plate in a first position overlays the one side of the bristle-holding head; and
   c) a plunger fixed to and projecting from the combing plate, with the plunger reciprocally mounted to the bristle-holding head to displace the combing plate along the bristles to a second position spaced from the one side of the bristle-holding head and at a free end of the bristles when the plunger is pushed, with the plunger operationally connected to latch with the bristle-holding head and automatically locking the combing plate in the second position when the plunger is depressed;
   wherein the plunger includes:
   a) a push button engaging the combing plate wherein when the rush button is pushed, the combing plate moves from the first position to the second position; and
   b) a coil spring loaded in the push button and working against the bristle-holding head, with the coil spring biasing the combing plate to the first position by urging the plunger away from the bristle-holding head; and
   wherein the push button further includes:
   a) a top plate having a top surface for engaging a finger depressing the push button and a bottom surface; and
   b) a plurality of mutually perpendicular walls depending from the bottom surface of the top plate; and wherein the plunger includes at least one leg member removably coupled at one end to one of the plurality of perpendicular walls, with the leg member passing through at least one slot in the bristle-holding head, with the leg having a second end fixed to and projecting from the combing plate so that when the push button is depressed the combing plate moves from the first position to the second position.

2. The self-cleaning hair brush in claim 1 further comprising, in combination:
   a) a slot disposed on the plunger;
   b) a latching pin pivotally secured to the bristle-holding head, when the latching pin is disposed in the slot, the combing plate is locked in the second position; and
   c) a plurality of guide projections disposed on the plunger, the guide projections guiding the latching pin into the slot as the plunger is depressed a first time, the guide projections guiding the latching pin out of the slot when the plunger is depressed a second time, with the plunger urging the combing plate to return to the first position when the latching pin is out of the slot, with the latching pin and the plurality of guide projections operatively connecting the plunger to latch with the bristle-holding head.

3. The self-cleaning hair brush in claim 2 wherein the latching pin includes a body segment and a first end portion bent perpendicular to the body segment and a second end portion bent perpendicular to the body segment, with the first end portion pivotally fastened to the bristle-holding head, and wherein the second end portion of the latching pin being disposed in the slot, the combing plate is locked in the second position.

4. The self-cleaning hair brush in claim 2 wherein the bristle-holding head includes a centrally disposed rectangular tube, with the plunger slidingly extending through the rectangular tube.

5. The self-cleaning hair brush in claim 4 wherein the latching pin includes a body segment and a first end portion bent perpendicular to the body segment and a second end portion bent perpendicular to the body segment, with the first end portion pivotally fastened to the bristle-holding head, and wherein the second end portion of the latching pin being disposed in the slot, the combing plate is locked in the second position.

6. The self-cleaning hair brush in claim 5 wherein the bristle-holding head further includes a cylindrical projection, with the coil spring concentrically disposed over the cylindrical projection preventing the coil spring from sliding along the bristle-holding head.

7. The self-cleaning hair brush in claim 6 wherein the bristle-holding head further comprising, in combination: a handle for gripping the bristle-holding head, with the handle having a first end connected to the bristle-holding head and extending radially from a periphery of the bristle-holding head.

8. A self-cleaning hairbrush comprising, in combination:
   a) a bristle-holding head having a plurality of spaced apart bristles projecting from one side of the bristle-holding head;

b) a combing plate having a plurality of bristle-receiving apertures, with the bristles projecting through the bristle-receiving apertures when the combing plate in a first position overlays the one side of the bristle-holding head; and c) a plunger fixed to and projecting from the combing plate, with the plunger reciprocally mounted to the bristle-holding head to displace the combing plate along the bristles to a second position spaced from the one side of the bristle-holding head and at a free end of the bristles when the plunger is pushed, with the plunger operationally connected to latch with the bristle-holding head and automatically locking the combing plate in the second position when the plunger is depressed;

wherein the plunger includes:

a) a push button engaging the combing plate wherein when the push button is pushed, the combing plate moves from the first position to the second position; and b) a coil spring loaded in the push button and working against the bristle-holing head, with the coil spring biasing the combing plate to the first position by urging the plunger away from the bristle-holding head; and wherein the bristle-holding head further includes a cylindrical projection, with the coil spring concentrically disposed over the cylindrical projection preventing the coil spring from sliding along the bristle-holding head.

9. A self-cleaning hairbrush comprising, in combination:

a) a bristle-holding head having a plurality of spaced apart bristles projecting from one side of the bristle-holding head;

b) a combing plate having a plurality of bristle-receiving apertures, with the bristles projecting through the bristle-receiving apertures when the combing plate in a first position overlays the one side of the bristle-holding head;

c) a plunger fixed to and projecting from the combing plate, with the plunger reciprocally mounted to the bristle-holding head to displace the combing plate along the bristles to a second position spaced from the one side of the bristle-holding head and at a free end of the bristles when the plunger is pushed, with the plunger operationally connected to latch with the bristle-holding head and automatically locking the combing plate in the second position when the plunger is depressed;

d) a slot disposed on the plunger;

e) a latching pin pivotally secured to the bristle-holding head, when the latching pin is disposed in the slot, the combing plate is locked in the second position; and f) a plurality of guide projections disposed on the plunger, the guide projections guiding the latching pin into the slot as the plunger is depressed a first time, the guide projections guiding the latching pin out of the slot when the plunger is depressed a second time, with the plunger urging the combing plate to return to the first position when the latching pin is out of the slot, with the latching pin and the plurality of guide projections operatively connecting the plunger to latch with the bristle-holding head.

10. The self-cleaning hair brush in claim 9 wherein the bristle-holding head includes a centrally disposed rectangular tube, with the plunger slidingly extending through the rectangular tube.

11. A self-cleaning hair brush comprising, in combination:

a) a bristle-holding head having a plurality of spaced apart bristles projecting from one side of the bristle-holding head;

b) a combing plate having a plurality of bristle-receiving apertures, with the bristles projecting through the bristle-receiving apertures when the combing plate in a first position overlays the one side of the bristle-holding head;

c) a plunger fixed to and projecting from the combing plate, with the plunger reciprocally mounted to the bristle-holding head to displace the combine plate along the bristles to a second position spaced from the one side of the bristle-holding head and at a free end of the bristles when the plunger is pushed, with the plunger operationally connected to latch with the bristle-holding head and automatically locking the combing plate in the second position when the plunger is depressed; and d) a latching pin latching between the bristle-holding head and the plunger to operationally connect the plunger to latch with the bristle-holding head and automatically locking the combing plate in the second position when the plunger is depressed.

12. The self-cleaning hair brush of claim 11 wherein the latching pin is pivotally secured to one of the bristle-holding head and the plunger.

13. The self-cleaning hair brush of claim 12 wherein a first end of the latching pin is pivotally fastened to said one of the bristle-holding head and the plunger, and wherein a second end of the latching pin is slideable in a slot formed in the other of the bristle-holding head and the plunger.

14. The self-cleaning hair brush of claim 13 further comprising, in combination:

a plurality of guide projections, with the guide projections guiding the second end of the latching pin into the slot as the plunger is depressed a first time, the guide projections guiding the latching pin out of the slot when the plunger is depressed a second time, with the plunger urging the combing plate to return to the first position when the latching pin is out of the slot.

15. The self-cleaning hair brush of claim 14 wherein the first end of the latching pin is pivotally fastened to the bristle-holding head and the slot is disposed on the plunger.

* * * * *